United States Patent
Nakajima

(10) Patent No.: US 11,117,211 B2
(45) Date of Patent: Sep. 14, 2021

(54) SPOT WELDING ELECTRODE HOUSING APPARATUS

(71) Applicant: KYOKUTOH CO., LTD., Aichi (JP)

(72) Inventor: Kotaro Nakajima, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 350 days.

(21) Appl. No.: 16/200,709

(22) Filed: Nov. 27, 2018

(65) Prior Publication Data

US 2019/0091792 A1    Mar. 28, 2019

Related U.S. Application Data

(63) Continuation of application No. PCT/JP2017/034094, filed on Sep. 21, 2017.

(30) Foreign Application Priority Data

Dec. 12, 2016 (JP) .............................. JP2016-240139

(51) Int. Cl.
| | |
|---|---|
| *B23K 9/28* | (2006.01) |
| *B23K 9/133* | (2006.01) |
| *B23K 11/30* | (2006.01) |
| *B23K 11/11* | (2006.01) |

(52) U.S. Cl.
CPC ............ *B23K 9/282* (2013.01); *B23K 9/1336* (2013.01); *B23K 11/11* (2013.01); *B23K 11/3072* (2013.01)

(58) Field of Classification Search
CPC ........ B23K 9/28; B23K 9/282; B23K 9/1336; B23K 11/11; B23K 11/3072
See application file for complete search history.

(56) References Cited

U.S. PATENT DOCUMENTS

2010/0147806 A1*   6/2010   Nakajima .......... B23K 11/3072
                                                                  219/86.25
2012/0118790 A1*   5/2012   Braeuer .................. B65D 1/00
                                                                  206/722

FOREIGN PATENT DOCUMENTS

| CA | 2 986 291 A1 | 1/2018 |
|---|---|---|
| CN | 1880025 A | 12/2006 |
| CN | 101873906 A | 10/2010 |

(Continued)

OTHER PUBLICATIONS

Extended European Search Report dated Feb. 21, 2020 from corresponding European Patent Application No. 17 88 1626, 6 pages.

(Continued)

*Primary Examiner* — Brian W Jennison
(74) *Attorney, Agent, or Firm* — Ohlandt, Greeley, Ruggiero & Perle, L.L.P.

(57) ABSTRACT

In the present disclosure, a housing (4) has a housing passageway (R1) housing a plurality of electrodes (10) linearly therewithin. An electrode withdrawal opening (R2) communicating with the housing passageway (R1) is formed on one end of the housing (4). A pressing unit (5) presses toward one end of the housing passageway (R1) the plurality of electrodes (10) arranged side by side and housed in the housing passageway (R1). A lever member (6) is swung to switch between a state where withdrawal of the electrode (10) from the electrode withdrawal opening (R2) is restrained and a state where the electrode withdrawal opening (R2) is exposed. A regulating coil spring (7) urges and swings the lever member (6) to one side.

11 Claims, 7 Drawing Sheets

(56) References Cited

FOREIGN PATENT DOCUMENTS

| | | |
|---|---|---|
| DE | 10 2009 058937 B3 | 5/2011 |
| JP | S54-136189 U | 3/1979 |
| JP | 59-1509 S | 1/1984 |
| JP | 2006-068787 A | 3/2006 |
| JP | 4450376 B2 | 4/2010 |
| JP | 2013-514182 A | 4/2013 |
| KR | 10-1672363 B1 | 11/2016 |
| WO | 2015/036971 A1 | 3/2015 |

OTHER PUBLICATIONS

Japanese Office Action dated Jan. 14, 2020 from corresponding Japanese application No. 2018-556193, 6 pages.
International Search Report dated Nov. 21, 2017 from corresponding International (PCT) patent application No. PCT/JP2017/034094, 5 pages.
Written Opinion dated Nov. 21, 2017 from corresponding International (PCT) patent application No. PCT/JP2017/034094, 4 pages.
Chinese First Office Action dated Jun. 22, 2020 from corresponding Chinese Patent Application No. 201780031973.3, 16 pages.
Canadian Office Action dated Nov. 14, 2019 from corresponding Canadian patent application No. 3,024,981, 3 pages.

* cited by examiner

SPOT WELDING ELECTRODE HOUSING APPARATUS

CROSS-REFERENCE TO RELATED APPLICATION

This application is a continuation of International Application No. PCT/JP2017/034094 filed on Sep. 21, 2017, which is incorporated herein by reference in its entirety and for all purposes.

BACKGROUND OF THE DISCLOSURE

1. Field of the Disclosure

The present disclosure relates to spot welding electrode housing apparatuses where an electrode for spot welding used in, for example, automobile production lines is housed so as to be mountable to a shank of a welding gun.

2. Description of the Related Art

Conventionally, in automobile production lines, several press molded products are joined by means of spot welding to assemble a vehicle body. The spot welding is generally performed by using a welding gun attached to a distal end of an arm of an industrial robot.

An electrode is mounted to a shank of a welding gun by fitting a distal end of the shank into a fitting recess of the electrode. The electrode is worn out due to repeated use in spot welding, and thus needs to be periodically replaced. In order to efficiently mount an electrode to the shank of the welding gun during replacement of the electrode, a spot welding electrode housing apparatus as disclosed in Japanese Translation of PCT International Application Publication No. 2013-514182 is placed in, for example, automobile production lines.

The foregoing electrode housing apparatus includes a rectangular prism shaped housing having a housing passageway therewithin. The housing passageway can house a plurality of electrodes that are arranged side by side and linearly in a direction perpendicular to the central axes of the electrodes, with fitting recesses of the electrodes open in the same direction. An electrode withdrawal opening is formed on one end of the housing passageway for withdrawing electrodes from the housing passageway, while a pressing unit is formed on the other end to press one or side by side arranged electrodes housed in the housing passageway toward the one end of the housing passageway by applying spring force. A withdrawal regulating member is movable in a direction perpendicular to the longitudinal direction of the housing and disposed on an one end side of the housing passageway. The withdrawal regulating member moves to one side by means of biasing force of a coil spring to cover partially the electrode withdrawal opening, and thus restrains the withdrawal of an electrode from the electrode withdrawal opening. The withdrawal regulating member then moves to the other side against the biasing force of the coil spring to expose the electrode withdrawal opening, and thus permits the withdrawal of an electrode from the electrode withdrawal opening. A shank end is then fitted into a fitting recess of an electrode that is one adjacent to the withdrawal regulating member among electrodes juxtaposed in the housing passageway, to move the electrode toward the electrode withdrawal opening. The electrode is then taken out from the electrode withdrawal opening having exposed by moving the withdrawal regulating member to the other side against the biasing force of the coil spring. Thereafter, an electrode next to the electrode having taken out is moved toward the one end side of housing passageway due to the spring force of the pressing unit and brought into contact with the withdrawal regulating member having moved to the one side due to the biasing force of the coil spring, enabling restriction of the electrode withdrawal from the electrode withdrawal opening.

SUMMARY OF THE DISCLOSURE

In the electrode housing apparatus as described above, the withdrawal regulating member moves whenever the withdrawal of an electrode from the electrode withdrawal opening is performed. It is thus desirable to minimize occurrence of operational failures caused by waste and dust, etc., in a moving part of the withdrawal regulating member. Yet Japanese Application Publication No. 2013-514182 is silent with respect to such matter.

The present disclosure has been developed in view of the foregoing background. An object of the present disclosure is thus to provide a spot welding electrode housing apparatus with less occurrence of operational failures even when the apparatus is repeatedly used.

To achieve the object, the present disclosure includes a lever shaped member as a member for restraining withdrawal of an electrode.

Specifically, the present disclosure is directed to a spot welding electrode housing apparatus that is able to house a plurality of electrodes used for spot welding, and provides the following solutions.

According to a first aspect of the disclosure, a spot welding electrode housing apparatus includes: a housing having a housing passageway therewithin and an electrode withdrawal opening on one end thereof, the housing passageway capable of housing a plurality of electrodes to be arranged side by side and linearly in a direction perpendicular to a central axis of the electrode with fitting recesses of the electrodes for fitting onto a shank end of a welding gun open in a same direction, the electrode withdrawal opening configured to communicate with the housing passageway; a pressing means configured to press one electrode or the plurality of side by side arranged electrodes housed in the housing passageway toward one end of the housing passageway; a lever member swingably supported in the housing and around a swing axial center that extends in the same direction as the central axis of the electrode housed in the housing passageway, and configured to be movable between a first position where the lever member is swung to one side and a tip side of the lever member covers a portion of the electrode withdrawal opening and a second position where the lever member is swung to the other side and the tip side of the lever member exposes the electrode withdrawal opening; and a first biasing means configured to urge and swing the lever member to the one side.

According to a second aspect of the disclosure which is an embodiment of the first aspect of the disclosure, the lever member and the first biasing means are disposed inside the housing.

According to a third aspect of the disclosure which is an embodiment of the second aspect of the disclosure, the lever member is arranged to have a tip portion thereof located at an electrode withdrawal opening side of the housing passageway and a swing axial center side thereof located at an inner part of the housing passageway.

According to a fourth aspect of the disclosure which is an embodiment of the third aspect of the disclosure, the lever member has a passageway forming face extending along an extension direction of the housing passageway and forming a portion of an inner face of the housing passageway.

According to a fifth aspect of the disclosure which is an embodiment of the fourth aspect of the disclosure, the passageway forming face has on the tip side of the lever member a curved surface corresponding to an outer circumferential surface of the electrode.

According to a sixth aspect of the disclosure which is an embodiment of any one of the first to fifth aspects of the disclosure, the housing passageway has a first passageway and a second passageway, the first passageway linearly extending toward one longitudinal end of the housing, the second passageway extending from an extension end of the first passageway in a direction intersecting with the first passageway and opening at an extension end of the second passageway, and an opening portion at the extension end of the second passageway being the electrode withdrawal opening.

According to a seventh aspect of the disclosure which is an embodiment of the sixth aspect of the disclosure, the lever member is disposed on the one end of the housing passageway, has a swing axis located at the extension end of the first passageway, and is shaped to extend from the swing axis to the electrode withdrawal opening along an extension direction of the second passageway.

According to an eighth aspect of the disclosure which is an embodiment of the sixth or seventh aspect of the disclosure, the pressing means includes a slider disposed in the housing passageway and configured to be movable back and forth along the first passageway; and a second biasing means configured to urge the slider in an advance direction. The slider is provided in front thereof with a pressing member supported axially on the slider to be rotatable around a rotation axial center extending in the same direction as the central axis of the electrode housed in the housing passageway.

In the first aspect of the disclosure, a structure as seen in the lever member allowing the electrode withdrawal opening to switch between open and closed states by swinging movement of the lever member keeps waste and dust, etc., from accumulating around the electrode withdrawal opening, as compared with a structure made by forming a guide groove in a housing and a withdrawal regulating member and sliding the withdrawal regulating member with respect to the housing to enable an electrode withdrawal opening to switch between open and closed states. This can minimize operational failures of the apparatus caused by waste and dust, etc.

In the second aspect of the disclosure, the lever member and the first biasing means may not be visible from the outside, resulting in an aesthetically pleasing appearance of the whole apparatus and improved design of the apparatus. For the reason that the lever member and the first biasing means are disposed inside the housing, other equipment and tools, even when coming into contact with the apparatus, touch the housing before making contact with movable parts of the lever member and the first biasing means. The lever member and the first biasing means thus can be prevented from becoming immovable following directly contacting with other equipment or tools.

In the third aspect of the disclosure, when the electrode contacting the lever member is pulled toward the electrode withdrawal opening, the lever member is swung against biasing force of the first biasing means to expose the electrode withdrawal opening. In this manner, the electrode can be smoothly taken out from the housing passageway.

After the electrode is withdrawn from the electrode withdrawal opening, an electrode next to the withdrawn electrode is on the point of emerging out of the electrode withdrawal opening due to pressure force of the pressing means. The lever member, however, is swung in the opposite direction to a moving direction of the electrodes in the housing passageway by means of the biasing force of the first biasing means so as to cover the electrode withdrawal opening. This can provide a secure stop of the electrode that is next to the withdrawn electrode and about to emerge out of the electrode withdrawal opening, at a position just before the electrode withdrawal opening.

In the fourth aspect of the disclosure, when the electrode is taken out from the electrode withdrawal opening, the passageway forming face of the lever member guides the electrodes smoothly toward the electrode withdrawal opening. In this way, the electrodes are efficiently moved to the electrode withdrawal opening by utilizing the lever member without requiring complicated structures around the lever member, thus achieving a cost effective apparatus.

In the fifth aspect of the disclosure, after the electrode is withdrawn from the electrode withdrawal opening, an electrode next to the withdrawn electrode moves to the electrode withdrawal opening by means of the pressure force of the pressing means. An outer circumferential surface of the electrode having moved to the electrode withdrawal opening is fitted with the curved surface of the lever member having swung due to the biasing force of the first biasing means. The next electrode to be taken from the electrode withdrawal opening thus can be completely stopped at a predetermined position just before the electrode withdrawal opening.

In the sixth aspect of the disclosure, the electrode withdrawal opening for taking out the electrode does not open in a direction to which the pressure force of the pressing means is applied. In this manner, after withdrawing the electrode from the electrode withdrawal opening, an electrode next to the withdrawn electrode is prevented from moving in the direction to which the pressure force of the pressing means is applied and from coming out of the electrode withdrawal opening due to excessive force. This ensures a secure one-by-one withdrawal of the electrodes from the electrode withdrawal opening. The pressing means also can have increased pressure force. The pressing means is thus selected to have pressure force sufficient to move the side-by-side arranged electrodes to the electrode withdrawal opening even when the pressure force of the pressing means is gradually decreased due to repeated use. This allows a secure movement of the electrodes to the electrode withdrawal opening.

In the seventh aspect of the disclosure, a larger length of the lever member is achieved in a direction intersecting with the longitudinal direction of the housing, thus enabling higher rigidity of the lever member. In the apparatus, the lever member is, even if repeatedly swung for withdrawing the electrodes, less likely to be deformed and damaged.

In the eighth aspect of the disclosure, as the slider advances and reaches in the vicinity of the extension end of the first passageway, the pressing member rotates with respect to the slider by means of biasing force of the second biasing means to enter into the second passageway. This enables the electrodes located in the second passageway to have a secure movement to the electrode withdrawal opening.

DETAILED DESCRIPTION OF THE DISCLOSURE

Embodiments of the present disclosure will be described hereinafter in detail with reference to the drawings. Note that the following description of preferred embodiments is merely illustrative in nature.

Figure 1:
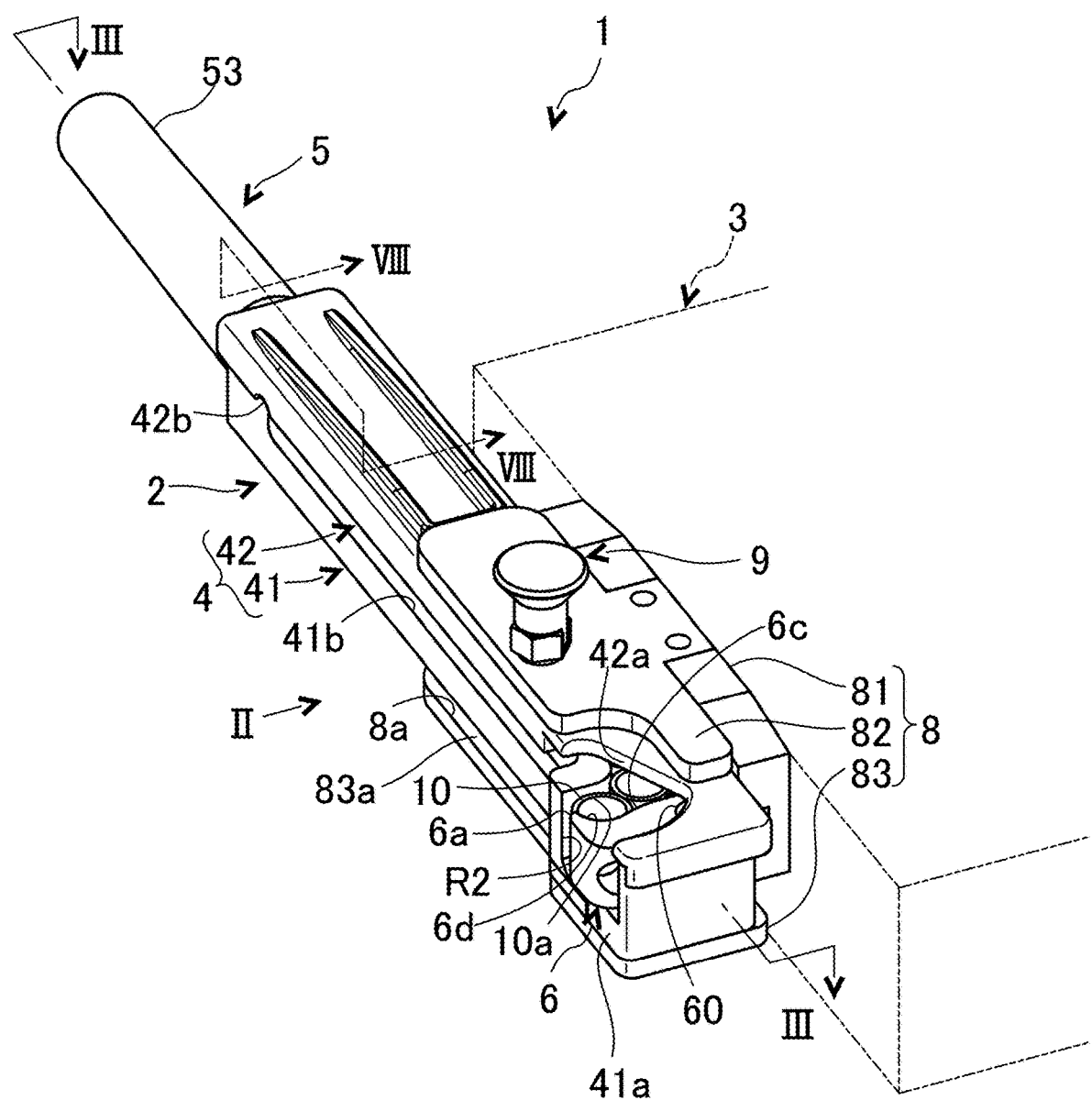
FIG. 1 is a perspective view of a spot welding electrode housing apparatus according to an embodiment of the present disclosure.
Figure 2:
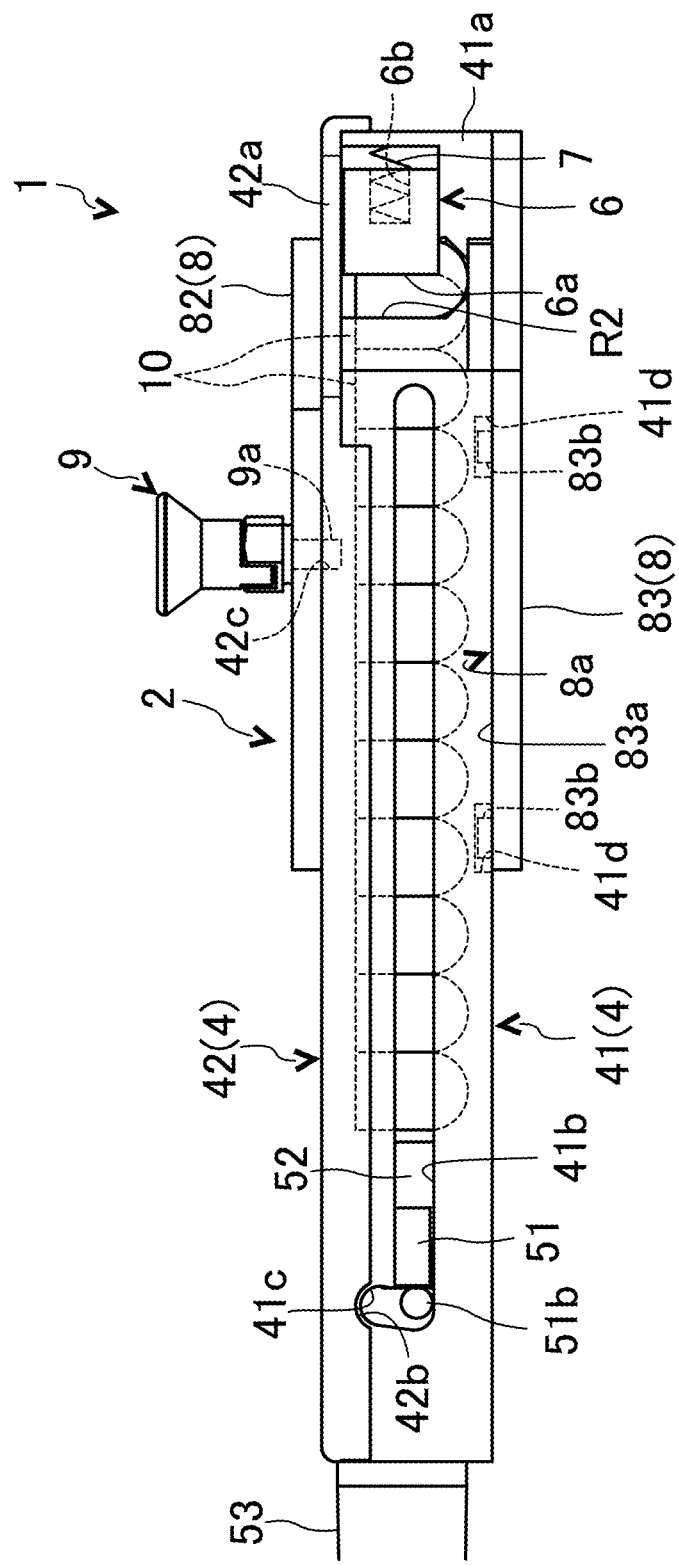
FIG. 2 is a view taken in the direction of the arrow II of FIG. 1.

FIGS. 1 and 2 show a spot welding electrode housing apparatus 1 according to an embodiment of the present disclosure. The electrode housing apparatus 1 is placed by the side of a vehicle body assembly path in an automobile production line. The electrode housing apparatus 1 houses a plurality of spot welding electrodes 10 so as to be mountable to a shank 11 of a welding gun held by a welding robot (see FIG. 5).

The electrode housing apparatus 1 has a linearly extending apparatus body 2, which includes a housing 4 that is generally in the shape of a rectangular prism.

Figure 3:
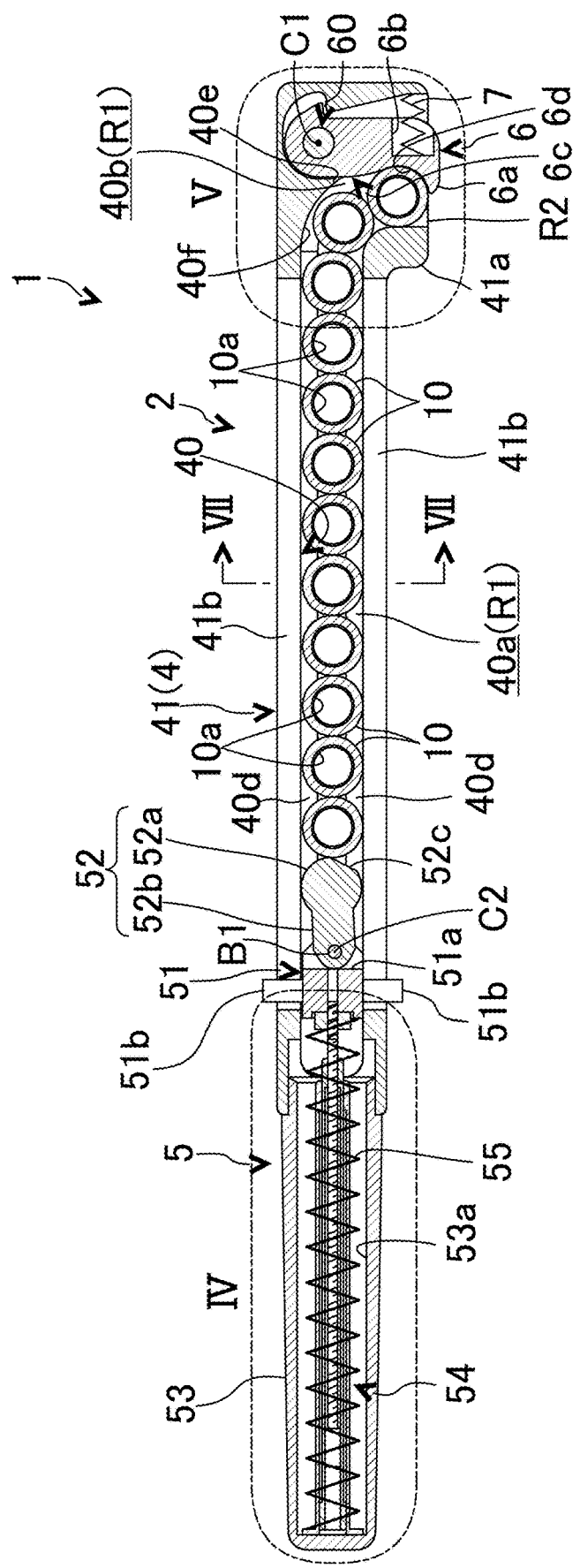
FIG. 3 is a cross sectional view taken along the line III-III of FIG. 1.

The housing 4 includes a housing body 41 having a U-shaped cross section and positioned in the back side of the housing 4 and a cover member 42 being generally rectangular plate-shaped and positioned in the front side of the housing 4. As shown in FIG. 3, a protuberance 41a protruding laterally is formed on one longitudinal end of the housing body 41.

A recessed groove 40 is formed in the housing body 41. The recessed groove 40 is generally L-shaped as viewed in plan. The recessed groove 40 opens toward the front side of the housing 4 and extends in the longitudinal direction of the housing 4.

The recessed groove 40 includes a first passageway 40a extending linearly toward the one longitudinal end of the housing 4 and a second passageway 40b extending from an extension end of the first passageway 40a in a direction intersecting with the first passageway, and an extension end of the second passageway 40b is open at a protuberance face of the protuberance 41a. The extension end of the second passageway 40b open at the protuberance face of the protuberance 41a constitutes an electrode withdrawal opening R2 of the present disclosure.

As shown in FIG. 3, a portion of an inner face of the first passageway 40a continuous with the second passageway 40b is provided with a pointed projection 40e that is generally triangular in shape as viewed in plan and projects toward the electrode withdrawal opening R2. The pointed projection 40e is shaped to have a thickness in the direction along the first passageway 40a being progressively smaller toward its distal end.

A curved guide face 40f is formed on a portion of the pointed projection 40e on the other longitudinal side of the housing 4. The curved guide face 40f is gently curved to be progressively closer to the extension end of the second passageway 40b in the direction of the extension end of the first passageway 40a.

A pair of guide holes 41b are formed in respective ones of side walls of the housing body 41 so as to oppose each other. Each of the guide holes 41b is slot-shaped and extends along the first passageway 40a. A latching recess 41c is formed at an end section of each guide hole 41b on the other longitudinal end of the housing 4 so as to be recessed toward the opening side of the recessed groove 40.

Figure 7:
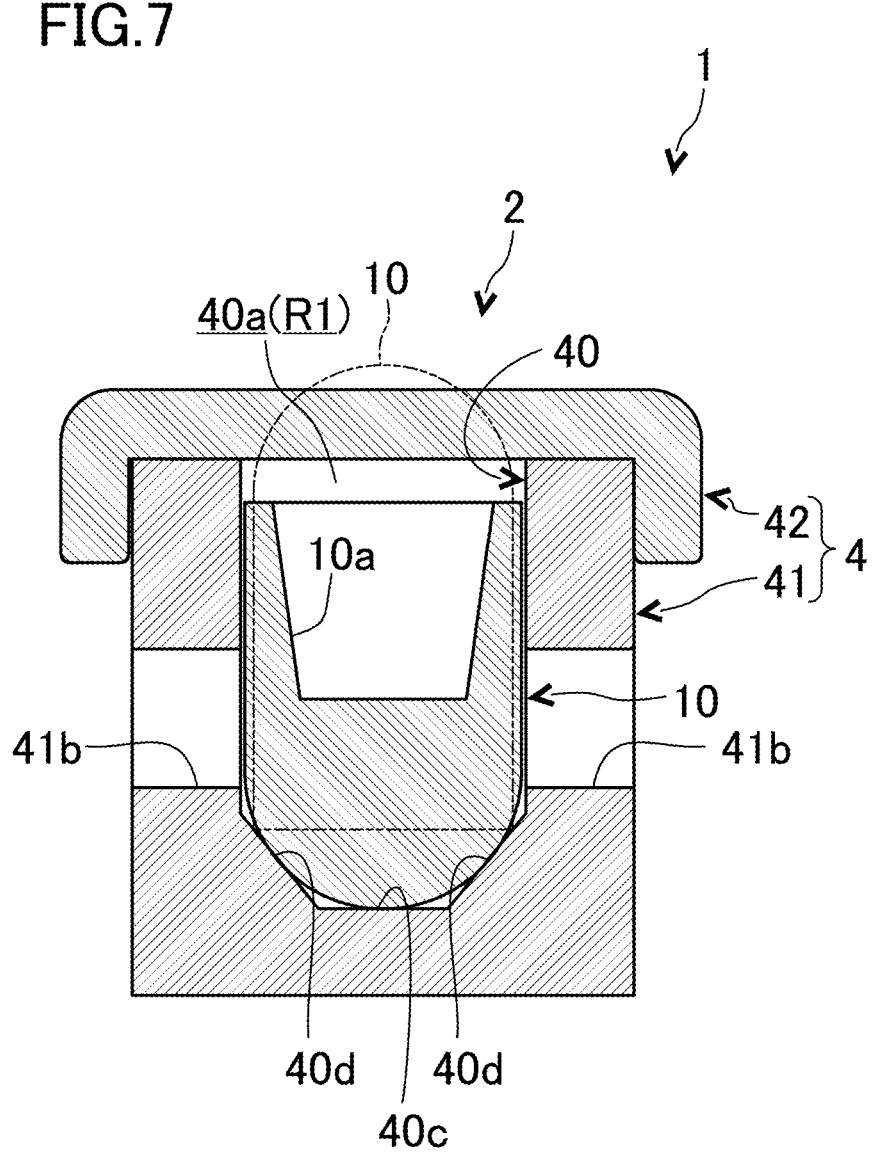
FIG. 7 is a cross sectional view taken along the line VII-VII of FIG. 3.

As shown in FIG. 7, a bottom surface of the recessed groove 40 includes a flat bottom surface 40c and a pair of inclined surfaces 40d. The flat bottom surface 40c is belt-shaped and extends along an extension direction of the recessed groove 40. Each of the inclined surfaces 40d extends away from its corresponding edge of the flat bottom surface 40c. The inclined surfaces 40d both contact a top end face of the electrode 10 to prevent a base end of the electrode 10 from jutting out from the recessed groove 40 when the electrode 10 is housed in the recessed groove 40 from its top end (see the electrode 10 shown in solid lines in FIG. 7). On the other hand, the inclined surfaces 40d both contact the base end of the electrode 10 to allow the top end face of the electrode 10 to jut out from the recessed groove 40 when the electrode 10 is housed in the recessed groove 40 from its base end (see the electrode 10 shown in double-dotted lines in FIG. 7).

As shown in FIG. 2, a pair of guide grooves 41d are formed in a bottom surface of the housing body 41. The guide grooves 41d extend along the second passageway 40b and are spaced apart at a predetermined distance in the direction along the first passageway 40a.

The cover member 42 has a U-shaped cross section and includes a first cutout recess 42a that is open laterally and formed on one longitudinal end side of the cover member 42.

A pair of second cutout recesses 42b open downward are formed in respective ones of side edges of the cover member 42 on the other longitudinal end side of the cover member 42. The second cutout recesses 42b are spaced apart in a direction perpendicular to the longitudinal direction of the cover member 42.

The cover member 42 also has a positioning recess 42c on the surface thereof near the one longitudinal end of the cover member 42.

The cover member 42 can be attached to the housing body 41 so as to cover the opening of the recessed groove 40. As shown in FIG. 3, a space formed between the recessed groove 40 and the cover member 42 attached to the housing body 41 constitutes a housing passageway R1 of the present disclosure.

The first cutout recess 42a corresponds to the extension end of the second passageway 40b when the cover member 42 is attached to the housing body 41. As shown in FIG. 1, the first cutout recess 42a is formed to be continuous with the electrode withdrawal opening R2.

Further, as shown in FIG. 2, the second cutout recesses 42b correspond to respective ones of the latching recesses 41c of the guide holes 41b when the cover member 42 is attached to the housing body 41.

The housing passageway R1 houses the plurality of electrodes 10 such that the electrodes 10 are arranged side by side and linearly in a direction orthogonal to the central axes of the electrodes 10 and that fitting recesses 10a of the electrodes 10 (see FIG. 7) for fitting onto a distal end of the shank 11 are open in the same direction.

Figure 4:
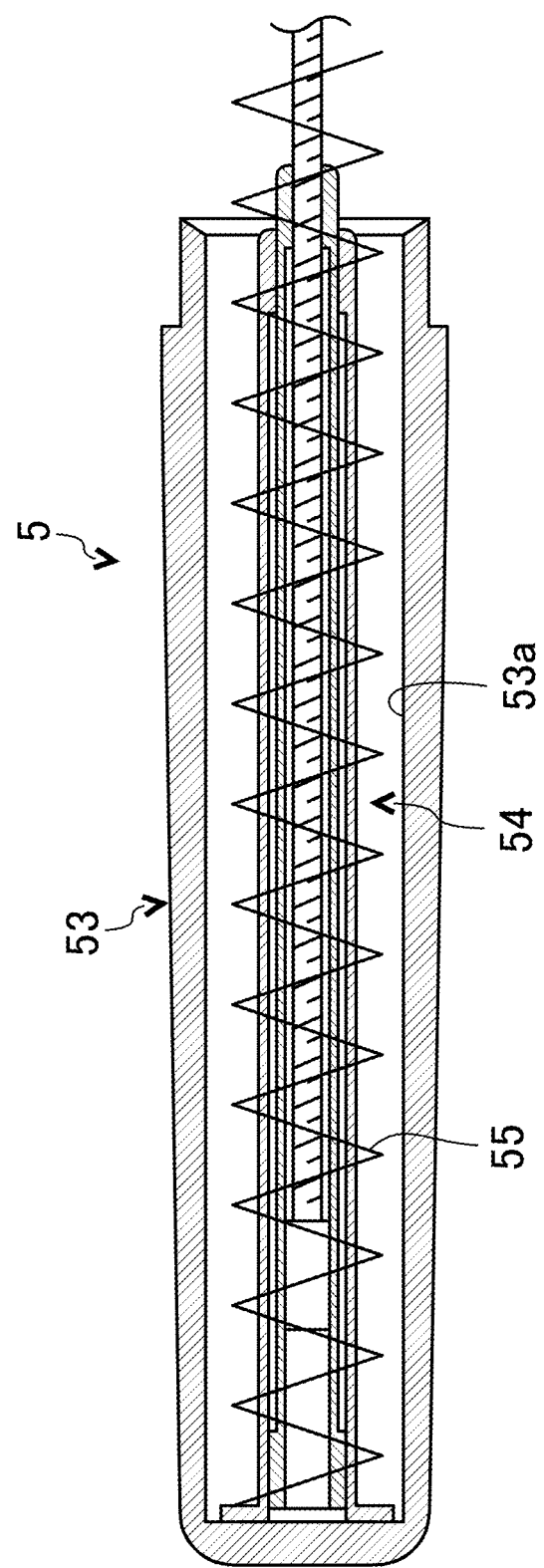
FIG. 4 is an enlarged view of the part IV of FIG. 3.

As shown in FIGS. 3 and 4, a pressing unit 5 (pressing means) is provided on the other longitudinal end of the housing 4.

The pressing unit 5 is provided with a block-shaped slider 51 disposed in the housing passageway R1. The slider 51 can move back and forth along the first passageway 40a.

Figure 8:
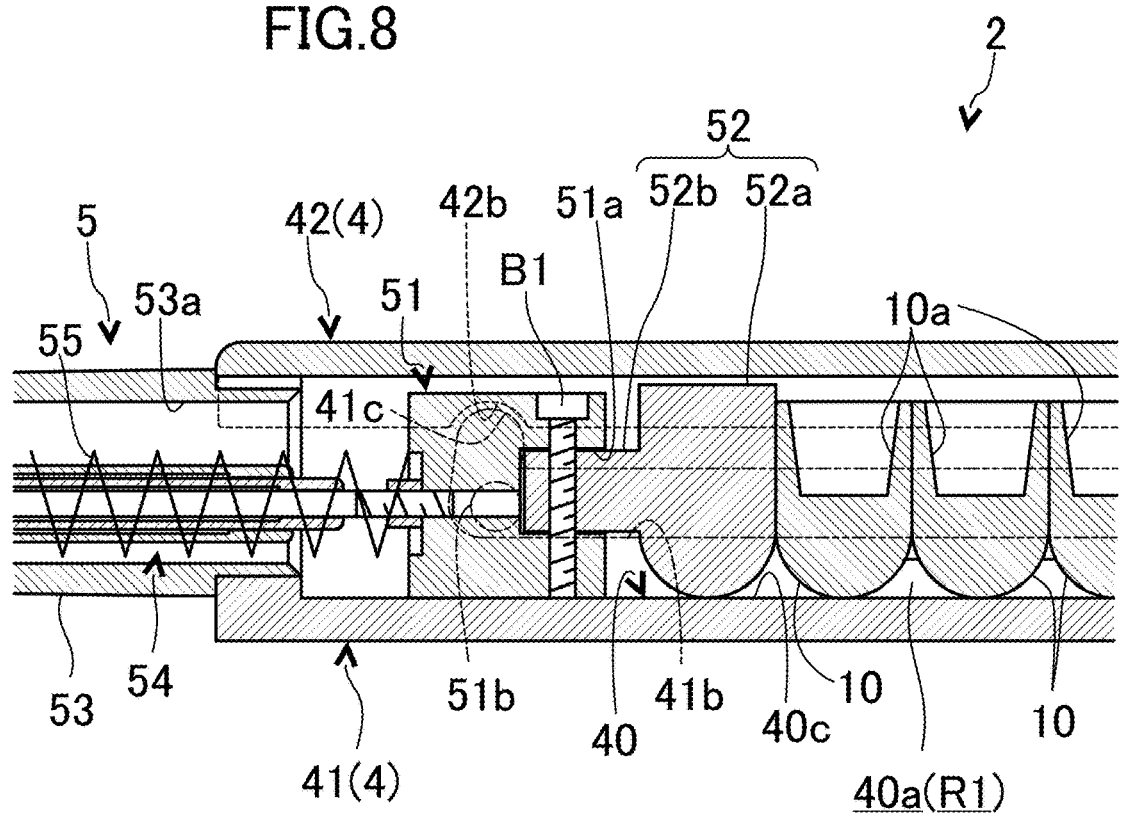
FIG. 8 is a cross sectional view taken along the line VIII-VIII of FIG. 1.
Figure 9:
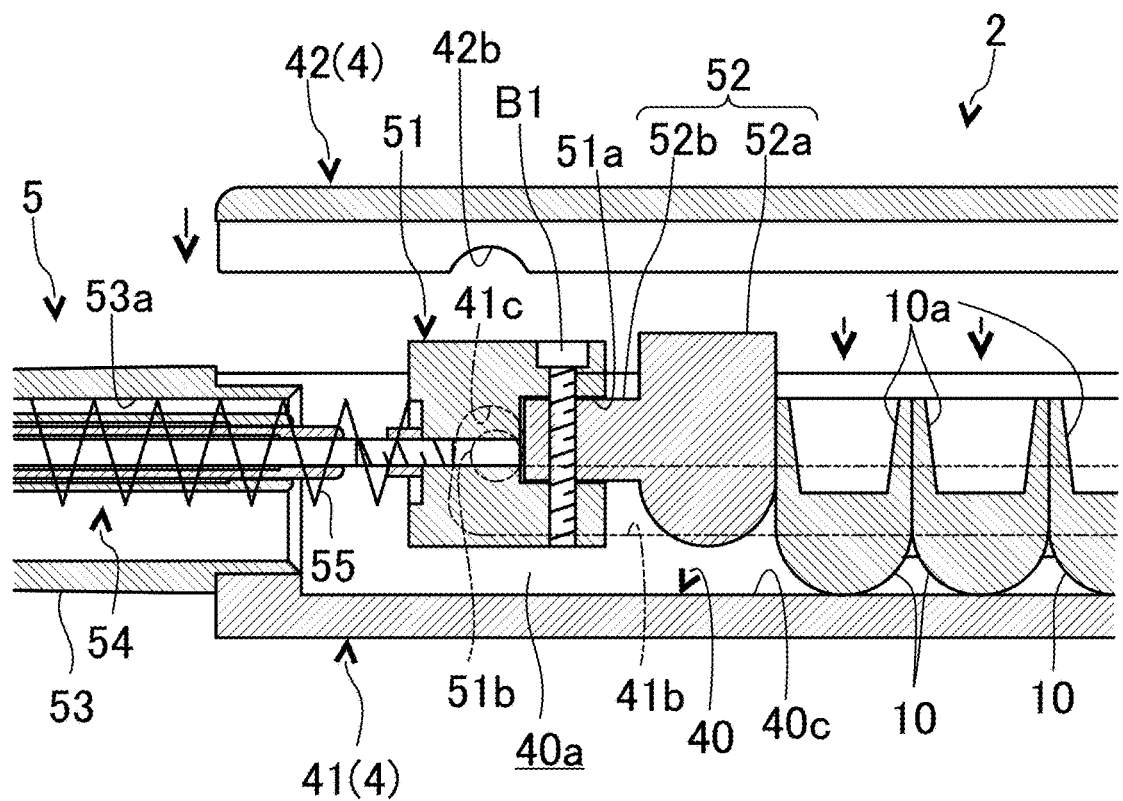
FIG. 9 is a view corresponding to FIG. 8 and illustrating a state where electrodes are being housed in a housing passageway.

As shown in FIGS. 8 and 9, a slot 51a extending in a direction orthogonal to the first passageway 40a is formed in a forward portion of the slider 51.

In front of the slider 51, a pressing member 52 that is substantially T-shaped as viewed from a side is provided.

The pressing member 52 includes a bell-shaped portion 52a having a similar shape to that of the electrode 10 and an extension 52b extending from the middle of the bell-shaped portion 52a toward the slot 51a of the slider 51. The extension 52b is axially supported by a bolt B1 in the forward portion of the slider 51 such that the pressing member 52 is rotatable in the direction along the second passageway 40b.

The pressing member 52 is thus axially supported to be rotatable around a rotation axial center C2 extending in the same direction as the central axes of the electrodes 10 accommodated in the housing passageway R1.

As shown in FIG. 3, a flat surface 52c is provided on an outer circumferential surface of the bell-shaped portion 52a opposite the extension 52b so as to face toward the electrode withdrawal opening R2.

A pair of protrusions 51b are also provided in the middle of respective ones of sides of the slider 51. The protrusions 51b protrude in the direction orthogonal to the first passageway 40a and away from each other.

Each of the protrusions 51b is inserted through its corresponding guide hole 41b. The guide holes 41b guide the protrusions 51b when the slider 51 moves back and forth.

Moreover, when the slider 51 is retracted and moved toward the opening side of the recessed groove 40 to hook the protrusions 51b onto the latching recesses 41c, the slider 51 juts out from the opening of the recessed groove 40, as shown in FIG. 9.

As shown in FIGS. 3 and 4, the pressing unit 5 includes a cylindrical cover 53 having a bottomed cylindrical shape. An peripheral edge of an opening of the cylindrical cover 53 is secured to the other longitudinal end of the housing 4.

A hollow portion 53a is formed inside the cylindrical cover 53 and open toward the housing 4. In the hollow portion 53a, a telescoping rod 54 having a telescoping mechanism is disposed.

A tip of the telescoping rod 54 is secured to a middle part of a rear end face of the slider 51. The telescoping rod 54 is extendable/retractable in the direction along the first passageway 40a as the slider 51 moves back and forth.

A compression coil spring 55 (second biasing means) is disposed in the hollow portion 53a of the cylindrical cover 53. The compression coil spring 55 wraps around the telescoping rod 54.

The compression coil spring 55 abuts a rear end of the slider 51 at one end thereof and a bottom surface of the cylindrical cover 53 at the other end thereof, so as to urge the slider 51 in an advance direction.

The pressing unit 5 thus presses one electrode or the plurality of electrodes 10 housed in the housing passageway R1 toward one end of the housing passageway R1.

A lever member 6 is disposed on the one end of the housing passageway R1. The lever member 6 is shaped to extend from the extension end of the first passageway 40a to the electrode withdrawal opening R2 along an extension direction of the second passageway 40b.

The lever member 6 is thus disposed inside the housing 4.

Figure 5:
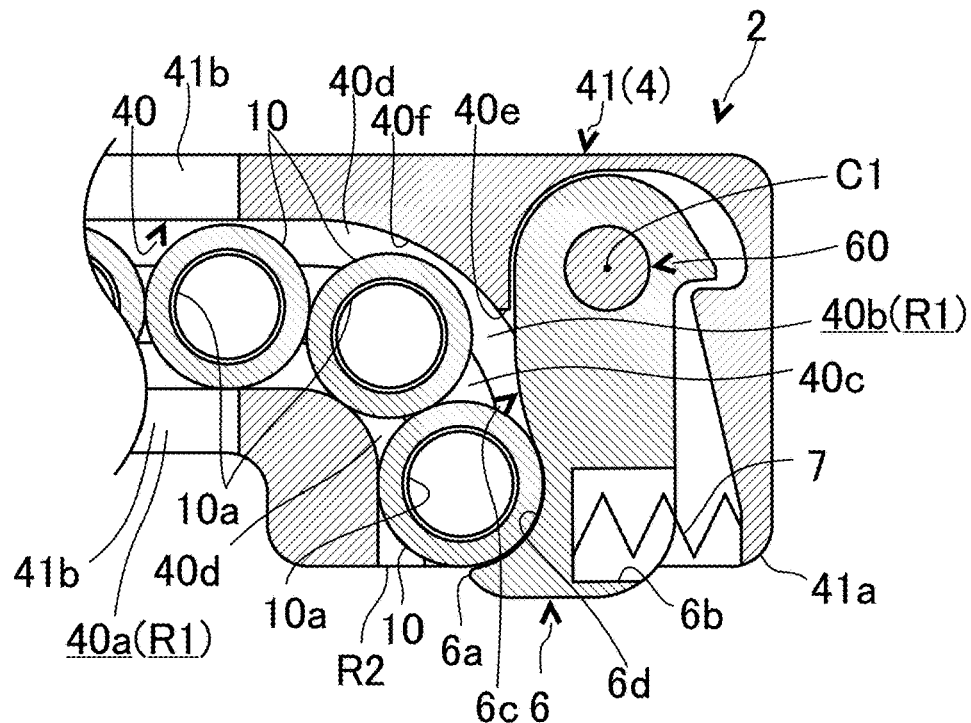
FIG. 5 is an enlarged view of the part V of FIG. 3.
Figure 6:
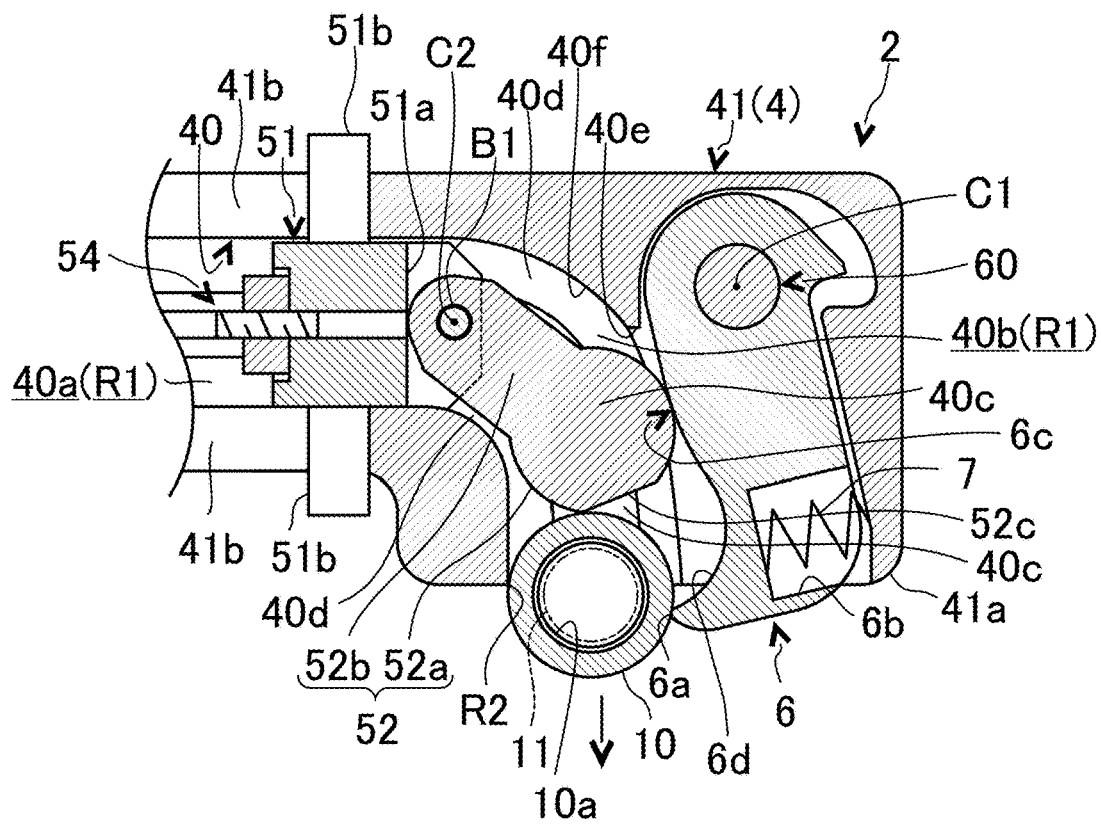
FIG. 6 is a view corresponding to FIG. 5 and illustrating a state where a last electrode housed in a housing passageway is being taken out of an electrode withdrawal opening.

The lever member 6 is positioned such that a tip potion thereof is located at the electrode withdrawal opening R2 side of the housing passageway R1 and a base end potion thereof is located at an inner part of the housing passageway R1. As shown in FIGS. 5 and 6, the base end portion of the lever member 6 is swingably supported in the housing 4 about a swing axis 60. A swing axial center C1 of the swing axis 60 extends in the same direction as the central axis of the electrode 10 housed in the housing passageway R1.

A claw portion 6a is provided at the tip of the lever member 6. The claw portion 6a projects toward the other longitudinal end of the housing 4 and is shaped to have a thickness in the direction along the second passageway 40b being progressively smaller toward its tip end.

A spring recess 6b is formed in a portion of the lever member 6 opposite to the claw portion 6a.

A passageway forming face 6c is formed on a portion of the lever member 6 on the other longitudinal end side of the housing 4. The passageway forming face 6c extends along the extension direction of the second passageway 40b (housing passageway R1).

A curved surface 6d is formed on the passageway forming face 6c on a tip side of the lever member 6 so as to be continuous with a tip section of the claw portion 6a. The curved surface 6d corresponds to an outer circumferential surface of the electrode 10.

The passageway forming face 6c on a base end side of the lever member 6 is flush with the curved guide face 40f. The passageway forming face 6c forms a portion of an inner face of the second passageway 40b.

The lever member 6 then performs swinging movements around the swing axial center C1 in the projection direction of the claw portion 6a (one side) and the opposite direction to the claw portion 6a (the other side) to switch between states where a portion of the electrode withdrawal opening R2 is covered (first position) and where the electrode withdrawal opening R2 is exposed (second position).

The lever member 6 thus moves to the one side and covers the portion of the electrode withdrawal opening R2 to restrain withdrawal of the electrode 10 from the electrode withdrawal opening R2, while moving to the other side and exposing the electrode withdrawal opening R2 to enable withdrawal of the electrode 10 from the electrode withdrawal opening R2.

The spring recess 6b houses a regulating coil spring (first biasing means). The regulating coil spring 7 urges such that the tip side of the lever member 6 is swung in the projection direction of the claw portion 6a (one side).

The regulating coil spring 7 is thus disposed inside the housing 4.

As shown in FIG. 1, the apparatus body 2 is mounted to one side of a tip dresser 3 (apparatus mounting body) using a bracket 8 having a U-shaped cross section.

The bracket 8 includes a fixed plate 81 secured to the tip dresser 3, as well as upper and lower plates 82, 83 extending parallel to each other from upper and lower edges of the fixed plate 81 so as to be away from the tip dresser 3.

A portion surrounded by the fixed plate 81 and the upper and lower plates 82, 83 constitutes a mounting recess 8a of the present disclosure. The housing 4 can be attached to the mounting recess 8a.

An index plunger 9 is attached in a middle part of the upper plate 82.

A surface of the lower plate 83 facing the upper plate 82 includes a guide surface 83a. As shown in FIG. 2, a pair of ribs 83*b* are formed in the guide surface 83*a* and can fit into respective ones of the guide grooves 41*d*.

The ribs 83*b* fit into the respective ones of guide grooves 41*d* when the index plunger 9 is pulled up to make the guide grooves 41*d* into conformance with the respective ones of ribs 83*b* and to move the housing 4 along the guide surface 83*a*. The housing 4 is then mounted to the mounting recess 8*a* by fitting a pin 9*a* of the index plunger 9 into the positioning recess 42*c* of the cover member 42. In this manner, the housing 4 is readily attached to the bracket 8 and a position of the housing 4 with respect to the bracket 8 can be accurately determined.

In this regard, varying widths of the guide grooves 41*d* prevent erroneously oriented attachment, etc., of the housing 4 with respect to the mounting recess 8*a*.

Withdrawal of an electrode 10 from the electrode housing apparatus 1 will be now explained in detail below.

First, a welding gun held by a welding robot is moved to correspond a distal end of a shank 11 of the welding gun with the first cutout recess 42*a* of the cover member 42.

Next, the shank 11 of the welding gun is moved toward the first cutout recess 42*a*. As shown in FIG. 5, the distal end of the shank 11 is then fitted into a fitting recess 10*a* of an electrode 10 that contacts the claw portion 6*a* of the lever member 6 with an outer circumferential surface of the electrode 10 fitting with the curved surface 6*d* of the lever member 6.

Thereafter, the welding gun is moved such that the electrode 10 attached to the distal end of the shank 11 moves toward the extension end of the second passageway 40*b*. The lever member 6 is then swung in the direction opposite to the projection direction of the claw portion 6*a* against biasing force of the regulating coil spring 7 to expose the electrode withdrawal opening R2, enabling withdrawal of the electrode 10 from the electrode withdrawal opening R2.

Once the electrode 10 attached to the shank 11 passes through the electrode withdrawal opening R2, the lever member 6 is swung in the projection direction of the claw portion 6*a* by means of the biasing force of the regulating coil spring 7 to cover a portion of the electrode withdrawal opening R2.

A plurality of electrodes 10 positioned side by side in the housing passageway R1 then move toward one side of the housing passageway R1 due to spring force of the pressing unit 5. An outer circumferential surface of an electrode 10 next to the electrode 10 having taken out from the electrode withdrawal opening R2 then fits with the curved surface 6*d* of the lever member 6 and contacts the claw portion 6*a*, resulting in a state ready for the next withdrawal of the electrode 10.

After the electrodes 10 housed in the housing passageway R1 are repeatedly withdrawn from the electrode withdrawal opening R2, one electrode 10 is left in the housing passageway R1, as shown in FIG. 6. In such case, the slider 51 reaches in the vicinity of the extension end of the first passageway 40*a* by being pressed by the compression coil spring 55, and the pressing member 52 is guided by the curved guide face 40*f* and the passageway forming face 6*c* and thereby rotates with respect to the slider 51 to enter into the second passageway 40*b*. This enables the electrodes 10 positioned in the second passageway 40*b* to be fully moved to the electrode withdrawal opening R2.

Accommodation of an electrode 10 in the housing passageway R1 of the housing 4 will be then explained in detail below.

First, after removing the cover member 42 from the housing body 41, an operator holds both protrusions 51*b* of the slider 51 to retract the slider 51 against biasing force of the compression coil spring 55.

Once the protrusions 51*b* reach respective ends of the guide holes 41*b* on the retraction side of the slider 51, the operator moves the slider 51 in the direction of the opening of the recessed groove 40. As shown in FIG. 9, the protrusions 51*b* thus enter into respective ones of the latching recesses 41*c* and the slider juts out from the opening of the recessed groove 40.

Thereafter, the operator releases the protrusions 51*b* and the protrusions 51*b* are then hooked onto the respective ones of the latching recesses 41*c* by means of the spring force of the compression coil spring 55. The operator thus can load electrodes 10 into the recessed groove 40 with his/her both hands, enabling the electrodes 10 to be housed in the recessed groove 40 in shorter time.

After the electrodes 10 are housed in the recessed groove 40, the operator attaches the cover member 42 to the housing body 41. As shown in FIG. 8, a portion of the slider 51 jutting out from the opening of the recessed groove 40 then contacts with the cover member 42, so that the protrusions 51*b* are released from the latching recesses 41*c* and the spring force of the compression coil spring 55 is applied to the electrodes 10 housed in the housing passageway R1. The attachment of the cover member 42 to the housing body 41 and the release of the protrusions 51*b* from the latching recesses 41*c* thus need not to be performed separately, enabling the operator to readily house the electrodes 10 in the housing passageway R1.

When the cover member 42 is removed from the housing body 41 and the slider 51 is retracted so as to insert the electrodes 10 into the recessed groove 40 and subsequently to attach the cover member 42 to the housing body 41, the electrodes 10 are housed in a side-by-side arrangement in the housing passageway R1 of the housing 4. This facilitates loading the electrodes 10 into the housing passageway R1 of the housing 4.

According to embodiments of the present disclosure, a structure as seen in the lever member 6 allowing the electrode withdrawal opening R2 to switch between open and closed states by swinging movement of the lever member keeps waste and dust, etc., from accumulating around the electrode withdrawal opening R2, as compared with, for example, a structure made by forming a guide groove in a housing 4 and a withdrawal regulating member that restrains withdrawal and by sliding the withdrawal regulating member with respect to the housing 4 to enable an electrode withdrawal opening R2 to switch between open and closed states. This can minimize operational failures caused by waste and dust, etc., in the electrode housing apparatus 1.

The lever member 6 and regulating coil spring 7 are disposed inside the housing 4 and thus may not be seen from the outside of the housing 4, resulting in an aesthetically pleasing appearance of the whole apparatus and improved design of the spot welding electrode housing apparatus 1.

The lever member 6 and regulating coil spring 7 are disposed inside the housing 4, so that even if other equipment and tools come into contact with the spot welding electrode housing apparatus 1, they touch the housing 4 before making contact with movable parts of the lever member 6 and regulating coil spring 7. The lever member 6 and the regulating coil spring 7 thus can be prevented from becoming immovable following directly making the lever member 6 and the regulating coil spring 7 contact with the other equipment or tools.

When the electrode 10 contacting the lever member 6 is pulled toward the electrode withdrawal opening R2, the lever member 6 is swung against biasing force of the regulating coil spring 7 to expose the electrode withdrawal opening R2. In this way, the electrode 10 can be smoothly taken out from the housing passageway R1. After the electrode 10 is taken out from the electrode withdrawal opening R2, an electrode 10 next to the taken-out electrode 10 is on the point of coming out from the electrode withdrawal opening R2 due to pressure force of a pressing unit 5. The lever member 6, however, is swung in the opposite direction to the moving direction of the electrodes 10 in the housing passageway R1 by means of the biasing force of the regulating coil spring 7 to cover the electrode withdrawal opening R2. Thus, a secure stop of the electrode 10 next to the withdrawn electrode 10 and on the point of emerging out of the electrode withdrawal opening R2 can be provided at a position just before the electrode withdrawal opening R2.

As the electrode 10 is withdrawn from the electrode withdrawal opening R2, the passageway forming face 6c of the lever member 6 guides each electrode 10 smoothly toward the electrode withdrawal opening R2. Accordingly, the electrode 10 is efficiently moved to the electrode withdrawal opening R2 by utilizing the lever member 6 without requiring complicated structures around the lever member 6, allowing the spot welding electrode housing apparatus 1 to be cost effective.

After the electrode 10 is withdrawn from the electrode withdrawal opening R2, an electrode next to the withdrawn electrode 10 moves to the electrode withdrawal opening R2 by means of the pressure force of the pressing unit 5. The outer circumferential surface of the electrode 10 having moved to the electrode withdrawal opening R2 then fits with the curved surface 6d of the lever member 6 having swung due to the biasing force of the regulating coil spring 7. This can provide a secure stop of the next electrode to be taken from the electrode withdrawal opening R2 at a predetermined position just before the electrode withdrawal opening R2.

The electrode withdrawal opening R2 for taking out the electrode 10 does not open in the direction, to which the pressure force of the pressing unit 5 is applied. After withdrawing the electrode 10 from the electrode withdrawal opening R2, the electrode 10 next to the withdrawn electrode 10 is thus prevented from moving in the direction to which the pressure force of the pressing unit 5 is applied and from coming out of the electrode withdrawal opening R2 as a result of excessive force. This ensures a secure one-by-one withdrawal of the electrodes 10 from the electrode withdrawal opening R2.

The pressing unit 5 also can have increased pressure force. The pressing unit 5 is thus selected to have pressure force sufficient to move the side-by-side arranged electrodes 10 to the electrode withdrawal opening R2 even when the pressure force of the pressing unit 5 is gradually decreased due to repeated use. This allows a secure movement of the electrodes 10 to the electrode withdrawal opening R2.

Moreover, a larger length of the lever member 6 is achieved in a direction intersecting with the longitudinal direction of the housing 4, thus enabling higher rigidity of the lever member 6. In the electrode housing apparatus 1, the lever member 6 is, even if repeatedly swung in withdrawal operation of the electrodes 10, less likely to be deformed and damaged.

Further, a pressing mechanism of the pressing unit 5 consists of the slider 51, pressing member 52, and compression coil spring 55 and is thus constructed by combining simple parts with lower cost per unit. This enables the electrode housing apparatus 1 at low cost.

Upon housing the electrodes 10 in the recessed groove 40 of the housing body 41, even if the electrodes 10 are housed in the recessed groove 40 from their base ends, top ends of the electrodes 10 jutting out from the recessed groove 40 prevent the cover member 42 from being attached to the housing body 41. This informs an operator of erroneously housed electrodes 10 with respect to the recessed groove 40. Thus, the electrode housing apparatus 1 will not be operated in the state where the electrodes 10 are incorrectly housed with respect to the recessed groove 40.

According to embodiments of the present disclosure, as the lever member 6 is swung in the projection direction of a claw portion 6a, the claw portion 6a covers a portion of the electrode withdrawal opening R2, but may be configured to cover the entire area of the electrode withdrawal opening R2.

According to embodiments of the present disclosure, the inclined surface 40d is formed to prevent the electrodes 10 from being erroneously housed with respect to the recessed groove 40. A curved surface can be formed on the bottom of the recessed groove 40 instead of the inclined surface 40d, on condition that top end faces of the electrodes 10 jut out from the recessed groove 40 when the electrodes 10 are housed in the recessed groove 40 from their base ends.

Further, according to embodiments of the present disclosure, the guide grooves 41d are formed in the housing body 41 and the ribs 83b fitting with respective ones of the guide grooves 41d are formed in the bracket 8, but is not limited to this configuration. For example, the guide grooves 41d may be formed in the bracket 8 and the ribs 83b fitting with the guide grooves 41d may be formed in the housing body 41.

The present disclosure is suitable for a spot welding electrode housing apparatus configured to house spot welding electrodes used in an automobile production line, etc., in a state where the electrodes are mountable to a shank of a welding gun.

The invention claimed is:

1. A spot welding electrode housing apparatus capable of housing a plurality of electrodes for use in spot welding, the apparatus comprising:
    a housing having a housing passageway therewithin and an electrode withdrawal opening on one end thereof, the housing passageway capable of housing the plurality of electrodes to be arranged side by side and linearly in a direction perpendicular to a central axis of the electrodes with fitting recesses of the electrodes for fitting onto a shank end of a welding gun open in a same direction, the electrode withdrawal opening configured to communicate with the housing passageway;
    a pressing unit configured to press one electrode or the plurality of side by side arranged electrodes housed in the housing passageway toward one end of the housing passageway;
    a lever member swingably supported in the housing and around a swing axial center that extends in a same direction as the central axis of the electrodes housed in the housing passageway, and configured to be movable between a first position where the lever member is swung to one side and a tip side of the lever member covers a portion of the electrode withdrawal opening and a second position where the lever member is swung to the other side and the tip side of the lever member exposes the electrode withdrawal opening; and
    a spring configured to urge and swing the lever member to the one side, wherein the housing passageway has a bottom surface that includes a flat bottom surface and a pair of inclined surfaces, the flat bottom surface extending along an extension direction of the housing passageway and being belt-shaped, and the pair of inclined surfaces extending from respective edges of the flat bottom surface away from one another, and wherein the pair of inclined surfaces are positioned so that while the electrodes can be housed in the housing passageway with a tip end of the electrodes being positioned at a bottom surface side of the housing passageway, the electrodes cannot be housed in the housing passageway with a base end of the electrodes being positioned at the bottom surface side of the housing passageway.

2. The apparatus of claim 1, wherein the lever member and the spring are disposed inside the housing.

3. The apparatus of claim 2, wherein the lever member is arranged to have a tip portion thereof located at an electrode withdrawal opening side of the housing passageway and a swing axial center side thereof located at an inner part of the housing passageway.

4. The apparatus of claim 3, wherein the lever member has a passageway forming face extending along the extension direction of the housing passageway and forming a portion of an inner face of the housing passageway.

5. The apparatus of claim 4, wherein the passageway forming face has on the tip side of the lever member a curved surface corresponding to an outer circumferential surface of the electrodes.

6. The apparatus of claim 1, wherein the housing passageway has a first passageway and a second passageway, the first passageway linearly extending toward one longitudinal end of the housing, the second passageway extending from an extension end of the first passageway in a direction intersecting with the first passageway and opening at an extension end of the second passageway, and an opening portion at the extension end of the second passageway being the electrode withdrawal opening.

7. The apparatus of claim 6, wherein the lever member is disposed on the one end of the housing passageway, has a swing axis located at the extension end of the first passageway, and is shaped to extend from the swing axis to the electrode withdrawal opening along an extension direction of the second passageway.

8. The apparatus of claim 6, wherein the pressing unit includes a slider that is back and forth movably disposed in the housing passageway; a telescoping rod having a distal tip secured to the slider, and including a telescoping mechanism to extend and retract along the housing passageway as the slider moves back and forth; and a second spring configured to urge the slider in an advance direction.

9. The apparatus of claim 8, wherein the second spring is wrapped around the telescoping rod.

10. The apparatus of claim 8, wherein the slider is provided in a front thereof with a pressing member pivotally supported by the slider to be rotatable around a rotation axis that extends in the same direction as the central axis of the electrodes being housed in the housing passageway.

11. The apparatus of claim 9, wherein the pressing unit includes a cylindrical cover having a hollow portion opening toward the housing, and a peripheral edge of an opening of the cylindrical cover being secured to the other longitudinal end of the housing, and wherein the telescoping rod and the second spring are disposed in the hollow portion.

* * * * *